No. 697,316. Patented Apr. 8, 1902.
R. S. BOYKIN.
NUT LOCK.
(Application filed Feb. 6, 1902.)
(No Model.)
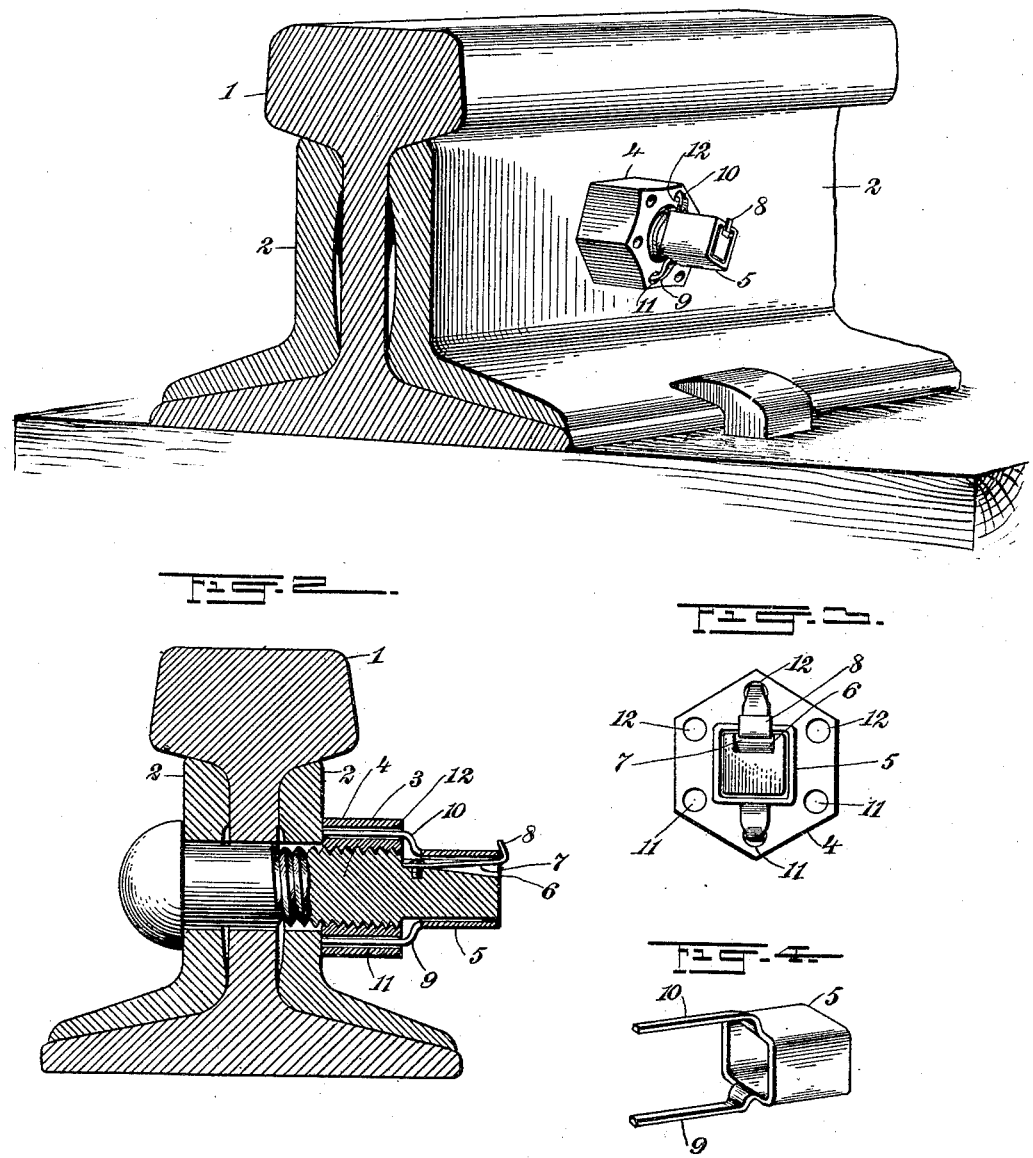
WITNESSES:
INVENTOR
Robert S. Boykin
BY
ATTORNEYS

UNITED STATES PATENT OFFICE.

ROBERT SINGLETON BOYKIN, OF MOSELLE, MISSISSIPPI.

NUT-LOCK.

SPECIFICATION forming part of Letters Patent No. 697,316, dated April 8, 1902.

Application filed February 6, 1902. Serial No. 92,780. (No model.)

*To all whom it may concern:*

Be it known that I, ROBERT SINGLETON BOYKIN, a citizen of the United States, and a resident of Moselle, in the county of Jones and State of Mississippi, have invented a new and Improved Nut-Lock, of which the following is a full, clear, and exact description.

This invention relates to improvements in nut-locks, and the object is to provide a nut-lock of simple construction that may be readily attached or detached.

I will describe a nut-lock embodying my invention and then point out the novel features in the appended claims.

Reference is to be had to the accompanying drawings, forming a part of this specification, in which similar characters of reference indicate corresponding parts in all the views.

Figure 1 is a sectional perspective view of a portion of a railway-rail, showing a nut-lock embodying my invention as applied thereto. Fig. 2 is a transverse sectional view of the same. Fig. 3 is a front view of the lock, and Fig. 4 is a perspective view of the lock-collar or sleeve.

While I have shown my invention as applied to the bolt and nut of a railway-rail, it is to be understood that it may be used in connection with bolts and nuts for other purposes.

Referring to the drawings, 1 designates a railway-rail; 2, the fish-plates; 3, the fastening-bolt, and 4 the nut therefor. The end of the bolt 3 is extended outward beyond the outer face of the nut, and this extended portion is made angular in cross-section and is designed to receive a collar or sleeve 5, the shape of which corresponds to the shape of said extended end of the bolt. This construction is to prevent a rotary movement of the collar on the bolt; but other means for preventing such rotary movement may be employed.

Secured to the bolt and movable in a recess 6 in one side of the projected portion is a spring-latch 7, having its end turned upward, as at 8, to engage with the outer end of the collar or sleeve 5 when the parts are in locked position. Extended from the inner end of the collar or sleeve are fingers 9 10, designed to engage in opposite perforations 11 12 in the nut.

In operation after placing the nut on the bolt the collar 5 is to be slid onto the extended end of the bolt, with the fingers 9 and 10 engaging in opposite perforations in the nut, as clearly shown in Fig. 2. When in position, the hook end of the spring 7 will engage the outer end of the collar, as before described, and prevent its accidental detachment. When it is desired to remove the locking device, however, the recess 6 is sufficiently deep to permit the spring to be moved downward, disengaging the hook from the end of the collar.

Having thus described my invention, I claim as new and desire to secure by Letters Patent—

1. A nut-lock comprising a bolt, a nut therefor, the said bolt having its end projected beyond the outer surface of the nut, a collar adapted to engage on said projected end, means for preventing a rotary movement of the collar relatively to the bolt, a device carried by the collar for engaging with the nut, and a spring attached to the bolt and operating to hold the collar in locking position, substantially as specified.

2. A nut-lock comprising a bolt, a nut therefor, the bolt having its end extended outward of the nut, the said end being made angular in cross-section, a collar for engaging over said end, a spring secured to the bolt and having a hook end for engaging with the outer end of the collar, and a device carried by the collar for engaging with the nut, substantially as specified.

3. A nut-lock comprising a bolt, a nut for the bolt and having perforations, the said bolt having its end extended outward from the nut, the said end being made angular in cross-section, a collar for engaging over said end, means for holding the collar in position on the bolt, and fingers extended from the collar and adapted to engage in perforations in the nut, substantially as specified.

In testimony whereof I have signed my name to this specification in the presence of two subscribing witnesses.

ROBERT SINGLETON BOYKIN.

Witnesses:
O. B. BRYAN,
J. H. BODIE.